US012730823B2

(12) United States Patent
Bódy

(10) Patent No.: US 12,730,823 B2
(45) Date of Patent: Sep. 8, 2026

(54) MANAGEMENT OF DATA TRANSFORMATION

(71) Applicant: DevRev, Inc., Palo Alto, CA (US)

(72) Inventor: Lörinc Bódy, Ljubljana (SI)

(73) Assignee: DevRev, Inc., Palo Alto, CA (US)

( * ) Notice: Subject to any disclaimer, the term of this patent is extended or adjusted under 35 U.S.C. 154(b) by 0 days.

(21) Appl. No.: 19/034,537

(22) Filed: Jan. 22, 2025

(65) Prior Publication Data

US 2026/0211895 A1 Jul. 23, 2026

(51) Int. Cl.
*G06F 16/20* (2019.01)
*G06F 16/25* (2019.01)
*G06F 16/27* (2019.01)

(52) U.S. Cl.
CPC ............ *G06F 16/254* (2019.01); *G06F 16/27* (2019.01)

(58) Field of Classification Search
None
See application file for complete search history.

(56) References Cited

U.S. PATENT DOCUMENTS 9,672,480 B2 * 6/2017 Goh ...................... G06F 16/275
2009/0037452 A1 * 2/2009 Baitalmal ............... G06F 16/27
2009/0037492 A1 * 2/2009 Baitalmal ............... G06F 16/27
2015/0142740 A1 * 5/2015 Behuria .................. G06F 16/27
707/634

* cited by examiner

*Primary Examiner* — Jau Shya Meng
(74) *Attorney, Agent, or Firm* — Vista IP Law Group, LLP

(57) ABSTRACT

Techniques for collaborative management of data transformation processes are disclosed. The techniques include triggering data transformation upon receiving extracted data from an external source, retrieving a recipe blueprint representing the transformation, and associating an active blueprint with the transformation. Multiple entities can collaboratively modify the blueprint. Modifications are recorded in a draft blueprint, which is compared to the active blueprint to determine customization differences. A remigration report is generated indicating changes if the draft becomes active. The draft blueprint transitions to active and is processed by applying customization differences. Ongoing synchronizations are performed using the transitioned active blueprint, transferring only changes and new data. The techniques allow flexible updates to transformation rules without disrupting operations, facilitate collaborative configuration, and increase efficiency through incremental synchronization approaches.

20 Claims, 5 Drawing Sheets

MANAGEMENT OF DATA TRANSFORMATION

TECHNICAL FIELD

The subject matter of the present invention relates to the management of extract-transform-load (ETL) processes. The subject matter described herein, in general, relates to collaborative management of data transformation process.

BACKGROUND

Extract-Transform-Load (ETL) process management typically encompasses several operational facets to move and transform data from various sources into a unified target system. For instance, the several operational facets may include data extraction from multiple sources, applying transformation rules to cleanse and standardize data, loading the processed data into the unified target system, and synchronization of the data between the sources and the target system. The several operational facets are often facilitated by careful planning, design, and implementation of data pipelines that can handle diverse data formats, volumes, and velocities.

BRIEF DESCRIPTION OF DRAWINGS

A detailed description is provided with reference to the accompanying figures. In the figures, the left-most digit(s) of a reference number identifies the figure in which the reference number first appears. The same numbers are used throughout the drawings to reference features and components.

FIG. 2 illustrates a system for management of data transformation, in accordance with another example of the present subject matter;

FIG. 4 illustrates a block diagram of a method for management of data transformation, in accordance with an example implementation of the present subject matter;

Figure 1:
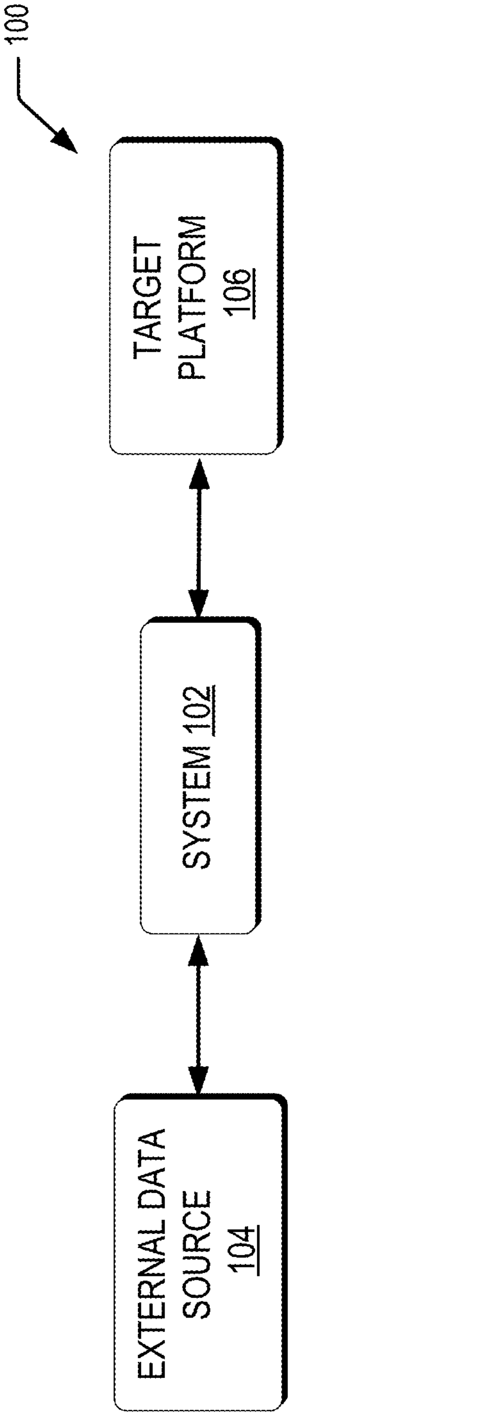
FIG. 1 illustrates a system for management of data transformation, in accordance with an example of the present subject matter.
Figure 1:

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

In modern connected computing environments, managing data transformation, for instance in an Extract-Transform-Load (ETL) process, between an external data source and a target platform presents significant challenges. The transformation of data from the external data source to the target platform requires a deep knowledge of both the source and target systems. The configuration process for the data transformation involves defining the specifications indicative of how data should be extracted from the external data source, transformed to meet the requirements of the target platform, and loaded into the target platform. For example, the configuration process may include mapping data fields, specifying transformation rules, setting up data filtering criteria, and defining any custom objects or fields needed in the target platform.

The configuration process is integral to the ETL process as it provides significant information about the occurrence of data extraction, transformation, and loading. The knowledge required for the configuration process often exceeds the scope of a single individual's expertise, as it requires familiarity with the external data source as well as the intricacies of target platform's data structure. Consequently, the configuration process may require a collaborative effort, requiring input from multiple team members with diverse areas of expertise.

Conventional data transformation systems often lack efficient mechanisms for collaborative configuration and management of ongoing synchronizations. In conventional data transformation systems, team members typically rely on sharing screenshots or exchanging information through side channels to ensure collaborative configuration. However, the conventional techniques may lead to miscommunications, errors, and inefficiencies. Further, the final submission of the configuration modifications is generally restricted to a single authorized entity, thereby creating a bottleneck, resulting in slow down of the process and introduction of errors if the collective input is misinterpreted or incorrectly applied by the single authorized entity.

Further, owing to the dynamic nature of data requirements and system changes, users may frequently discover the need to modify aspects of the configuration. For instance, the users may request to modify aspects of the configuration after an initial data import from data sources or while the synchronization has been set up and is already running. For instance, the modification request may arise due to changes in the external system data structures, evolving business requirements, or the realization that certain mappings are sub-optimal or incomplete.

In conventional systems, introducing changes or modifications in aspects of the configuration to an active synchronization is often disruptive and risky. The lack of flexibility in modifying active synchronization in the conventional systems may present significant challenges. In a conventional technique, the ongoing synchronization is stopped to implement modifications on receiving request from the users to modify aspects of the configuration, leading to data inconsistencies and operational disruptions. Further, implementing changes often necessitates a complete reset of the process, including deleting all previously imported data and starting the import from scratch. Thus, such an approach is time-consuming, resource-intensive, and carries the risk of data loss or temporary unavailability of critical information.

Furthermore, when changes are made to the synchronization configuration, conventional systems may struggle to efficiently update only the affected data. The conventional approaches generally require a full re-import of all data, which is inefficient and time-consuming, especially for large datasets. Such a limitation may make it difficult to implement minor modifications or corrections without incurring substantial operational overhead.

The challenge is further aggravated in providing robust mechanisms for testing and validating proposed modifications by the user before implementation in the conventional data transformation systems. This absence of an environment where modifications can be safely explored and refined leads to a higher risk of errors when changes are finally applied in the real-time environment. The lack of testing techniques may also discourage experimentation and iterative improvement of the sync configuration, as the cost of mistakes in the real-time environment is too high. In addition, in many conventional systems, there is a lack of transparency and version control in the configuration process, making it difficult for multiple team members to review, comment on, or suggest improvements to the synchronization configuration. This may further lead to suboptimal decisions, missed opportunities for improvement, and potential conflicts in the configuration strategies.

The present subject matter envisages techniques for managing data transformation. According to one exemplary embodiment, the present subject matter facilitates collaboratively managing Extract, Transform, Load (ETL) processes with automatic partial remigration. In an example implementation, an ETL process may begin once the data is extracted from an external data source. The external data source may refer to any system or application that holds data which needs to be integrated into a target system or a target platform. For example, the external data source may encompass a wide range of sources, such as Customer Relationship Management (CRM) systems, Enterprise Resource Planning (ERP) systems, databases, or any other application that serves as a repository of data. For instance, in a retail context, the external data source may be a point-of-sale system containing transaction data, customer information, and inventory details.

Upon receiving the extracted data from the external data source, the initiation of data transformation may be triggered. In an example, once the data transformation is initiated, a recipe blueprint associated with the data transformation may be retrieved. The recipe blueprint is a structured and comprehensive representation of the data transformation process. In an example, the recipe blueprint may encapsulate all the rules, mappings, and specifications needed to transform data from the external data source to the target system or a target data source. The recipe blueprint may be created by mapping the specifications of the external data source to the target data source. The mapping of the specifications may involve defining how each data element in the source system corresponds to elements in the target system. For instance, in a scenario where customer data is being integrated from a CRM system to a data warehouse, the recipe blueprint would specify how fields like "Customer Name," "Email," and "Purchase History" in the CRM system may be mapped to corresponding fields in the data warehouse schema.

The recipe blueprint has a dual-state nature, i.e., the recipe blueprint may exist in either a draft state or an active state. In the draft state, the recipe blueprint is editable, allowing for modifications and refinements. The editability of the recipe blueprint is crucial for the collaborative aspect of the system, as it allows multiple users to work on and refine the transformation rules. For example, a data analyst may propose changes to how customer segmentation is calculated, while a marketing specialist may suggest additional fields to capture for campaign tracking.

Once the recipe blueprint transitions from the draft state to the active state, it becomes immutable. The immutability of the recipe blueprint ensures that the active transformation process remains stable and consistent, preventing unexpected changes during ongoing data synchronizations. Further, the immutability of the active state is critical for maintaining data integrity and ensuring that all data transformations are performed consistently until a new version of the blueprint is deliberately activated.

In an example implementation, an active recipe blueprint is associated with the data transformation process. The active recipe blueprint defines the transformation rules that will be applied to the extracted data. In an example, the transformation rules may be used to synchronize the extracted data from the external data source to the target data source. For instance, if the external source is a CRM system and the target is a data warehouse, the active recipe blueprint may specify how customer data fields in the CRM should be mapped and transformed to fit the schema of the data warehouse. The active recipe blueprint may include rules for data type conversions (e.g., converting date formats), data cleansing operations (e.g., standardizing phone number formats), or more complex transformations (e.g., calculating customer lifetime value based on transaction history).

One or more implementations of the present specification describes collaborative modification of the recipe blueprint. In an example, multiple users may request to modify the recipe blueprint. The collaborative approach of the multiple users may be particularly valuable in complex data integration scenarios where different team members may have specialized knowledge about various aspects of the data or systems involved. For example, in a healthcare setting, a data engineer may understand the technical aspects of integrating patient records from multiple systems, while a clinical researcher may have insights into how the data should be transformed to support specific research objectives. The present subject matter allows these diverse users to contribute their expertise to refine the data transformation process.

In an example implementation, at least one user amongst the multiple users may propose modifications in the recipe blueprint. The proposed modifications or changes in the recipe blueprint may be recorded in a draft recipe blueprint. This approach allows for experimentation and refinement without affecting the ongoing data synchronization processes that rely on the active recipe blueprint. The draft recipe blueprint may serve as a sandbox where new ideas and configurations can be reviewed and refined. For instance, if a company is considering a new way of categorizing products, data analysts of the company may create a draft recipe blueprint implementing a new categorization scheme and may preview the transformation results based on the draft blueprint, allowing them to assess the impact on data structure and format.

On recording the proposed modifications or changes in the draft recipe blueprint, the present subject matter performs a comparison step. In an example, the draft recipe blueprint may be compared with the active recipe blueprint to determine the differences in customization specifications that would need to be applied to the target data source. The customization specifications may refer to the detailed instructions for creating or modifying elements in the target data source to accommodate the transformed data.

In an example, the differences in customization specifications may include modifications to existing custom objects, fields, or elements in the target data source, or the creation of new custom objects, fields, or elements in the target data source to accommodate the transformed data. For example, a new modified recipe blueprint may introduce a new way of calculating customer loyalty scores, requiring the creation of new custom fields in the target system to store these scores and to potentially modify existing fields that feed into this calculation.

Based on the comparison, a remigration report may be generated. The remigration report may serve as a critical tool for understanding the impact of the proposed modification or changes. In an example, the remigration report may indicate the customization specifications that would be implemented if the draft recipe blueprint were to become active. The remigration report may serve as a preview of the modifications, allowing users to understand the full implications of their modifications before committing to them. For instance, the remigration report may show that activating the new draft recipe blueprint would require the creation of three new custom fields for storing detailed customer preferences, the modification of two existing fields to accommodate a new data format, and the creation of a new lookup table for a refined product categorization system.

The remigration report may be particularly valuable in complex data environments where changes can have far-reaching consequences. It may allow users to assess the impact on downstream systems, reports, and business processes that rely on the transformed data. For example, in a financial services context, the remigration report may highlight how proposed changes to transaction categorization could affect regulatory reporting requirements, allowing compliance officers to review and approve the changes before they are implemented.

In an example implementation, the draft recipe blueprint may be transitioned from its draft state to the active state to form a transitioned active recipe blueprint. The transition may represent the stage at which the proposed changes are put into effect. The transitioned active recipe blueprint may then be processed based on the generated remigration report. In an example, the processing of the transitioned active recipe blueprint may involve applying the determined differences in customization specifications to the target data source. For example, if the remigration report indicated the need for new custom fields to support a more granular customer segmentation model, this step would involve creating those fields in the target system, potentially including the setup of appropriate indexes, constraints, and data validation rules.

In an example implementation, the system may handle the previously extracted data. For instance, while processing the transitioned active recipe blueprint, the system may retrieve data that was previously extracted from the external data source and stored in an intermediate storage. The previously extracted data may then be re-transformed using the new transformation rules defined in the transitioned active recipe blueprint. The resulting changes from this re-transformation may then be applied to the existing records in the target data source. Such a comprehensive approach of the present subject matter ensures that not only the structure of the target system updated to reflect the new transformation rules, but the existing data within the target system is also brought into alignment with these new rules. This process maintains data consistency and integrity across the entire system, even as transformation rules evolve over time.

The transition process is a critical phase where the present subject matter ensures that all necessary changes are implemented correctly and consistently. This may involve a series of database operations, schema modifications, and potentially data migrations to align existing data with the new structure. The present subject matter may also handle any necessary data type conversions, apply default values where required, and ensure that all data integrity constraints are maintained throughout the transition.

Subsequently, ongoing data synchronizations may be performed between the external data source and the target data source using the transitioned active recipe blueprint. The ongoing data synchronizations may refer to the continuous process of keeping the data in the target data source up-to-date with changes in the external source. The synchronization process may be typically scheduled to run at regular intervals, which may range from real-time updates for critical data to daily or weekly synchronizations for less time-sensitive information. In an example, the frequency of the data synchronizations may depend on factors, such as the volume of data changes, the importance of data freshness for business operations, and the available system resources.

In an example implementation, the data synchronizations may transfer only the changes or new data from the external data source to the target data source. Such an incremental approach to data synchronization may be more efficient than full data transfers, especially when dealing with large datasets. For instance, in a retail scenario, if a customer's address is updated in the CRM system (the external data source), only this changed information would be transferred and updated in the data warehouse (the target data source) during the next synchronization cycle, rather than reprocessing the entire customer record or dataset.

The present subject matter thus offers several significant advantages in the field of data transformation. The present approach allows for flexible and dynamic updates to transformation rules without disrupting ongoing operations. The ability to make changes or modifications on recipe blueprints and preview changes through remigration reports reduces the risk associated with modifying data transformation processes in production environments. This may be particularly valuable in fast-paced business environments where data requirements can change rapidly, such as in e-commerce platforms that need to quickly adapt to new product categories or customer behavior patterns.

The present subject matter allows multiple users to view and modify recipe blueprints, thereby facilitating a more comprehensive and accurate configuration of data transformation rules. The collaborative approach including multiple users may be especially valuable in organizations where data integration involves multiple departments or requires diverse expertise. For example, in a multinational corporation, regional teams could collaborate on a global customer data integration project, each contributing their local knowledge to ensure that the data transformation process accommodates regional variations in data formats, regulatory requirements, and business practices.

Furthermore, the concept of customization specifications being automatically determined and applied based on modifications in recipe blueprint streamlines the process of adapting the target system to accommodate new or modified data structures, thereby reducing the manual effort required in such scenarios. The automation can significantly reduce the risk of human error in implementing complex schema changes and ensure that all necessary modifications are consistently applied across the target system. The present subject matter's ability to generate and utilize remigration reports adds a layer of governance and control to the data transformation process. The remigration reports may allow organizations to implement change management practices around their data integration processes, ensuring that all modifications are well-understood, properly reviewed, and approved before implementation.

The present subject matter is further described with reference to FIGS. 1-5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 102 for management of data transformation, according to an example implementation of the present subject matter. The system 102 may be implemented in various computing environments 100 and contexts. In an example, the system 102 may be deployed on platforms, allowing for scalability and accessibility across different geographical locations. In some cases, organizations may choose to implement the system 102 on-premises to maintain direct control over their data and infrastructure, especially in industries with strict data privacy regulations.

The system 102 may be communicatively coupled to various external systems and target data sources through a network infrastructure. In an example, the network infrastructure may include local area networks (LANs), wide area networks (WANs), cloud-based networks, or hybrid network configurations, enabling seamless communication and data transfer between the system 102 and its connected components. The system 102 may communicate with the external entities, such as various external systems and target data sources, through various communication protocols and interfaces, such as APIs, web services, database connectors, or secure file transfer protocols. In an example implementation, the system 102 may be communicatively coupled to an external data source 104 and a target platform 106.

In an example, the external data source 104 may include a wide range of data repositories and devices. For instance, the external data source 104 may encompass enterprise software solutions, cloud-based services, legacy databases, or even Internet of Things (IoT) devices generating real-time data streams. The external data source 104 may serve as an origin point for data that needs to be transformed and integrated into the target platform 106. The external data source 104 may vary greatly in terms of data format, structure, volume, and update frequency. The external data source 104 may provide data through various means such as API endpoints, database connections, file exports, or real-time streams.

In an example implementation, the target platform 106 may include a variety of data repositories or platforms designed to store, manage, and utilize the transformed data. The target platform 106 represents the destination where the transformed data will reside and be utilized. The target platform 106 may be chosen based on the organization's specific needs, such as data analysis requirements, operational processes, or integration with other systems. For instance, the target platform 106 may be data warehouses, business intelligence platforms, cloud-based storage solutions, operational databases, enterprise content management systems, and real-time analytics engines. The system 102 manages the extraction of data from the external data source 104, applies the transformation rules on the extracted data, and oversees the loading of transformed data into the target data source 106, as explained in detail with respect to FIG. 2.

Figure 2:
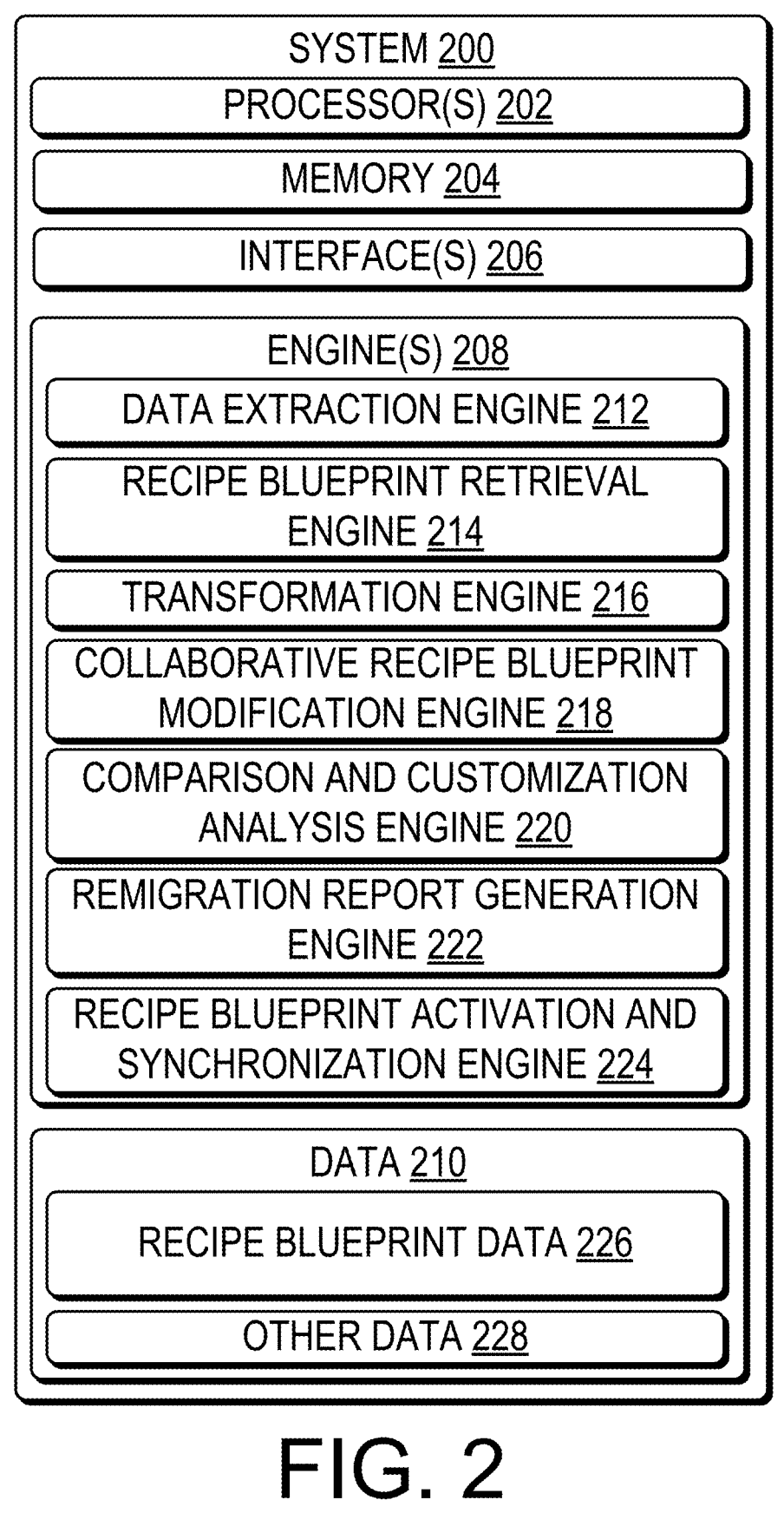

FIG. 2 illustrates a system 200 for management of data transformation, according to an example implementation of the present subject matter. The system 200 may include a computing device that has processing capabilities, such as a server, a desktop, a laptop, a tablet, a mobile phone, or the like. For instance, the system 200 may include, for example, a microprocessor, a microcomputer, a microcontroller, a digital signal processor, a central processing unit, a state machine, a logic circuitry, or a device that manipulates signals based on operational instructions. The system 200 may correspond to the system 102. The system 200 may include a processor 202, a memory 204, and an interface(s) 206.

The processor 202 may run at least one operating system and other applications and services. Further, the processor 202 can include one or more engines 208. The processor 202, amongst other capabilities, may be configured to fetch and execute computer-readable instructions stored in the memory 204. The processor 202 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor", may be provided through the use of dedicated hardware as well as hardware capable of executing machine readable instructions.

When provided by the processor 202, the functions may be provided by a single dedicated processor, by a single shared processor, or by a plurality of individual processors, some of which may be shared. Moreover, explicit use of the term "processor" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The memory 204 may be coupled to the processor 202 and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 204 may include data 210, such as a recipe blueprint data 226 and other data 228, that can be commissioned for data transformation.

The interface(s) 206 may include a variety of machine-readable instructions-based interfaces and hardware interfaces that allow the system 200 to interact with different entities, such as the processor 202 and the memory 204. Further, the interface may enable the components of the system 200 to communicate with computing devices, web servers, and external repositories. The interface may facilitate multiple communications within a wide variety of networks and protocol types, including wireless networks, wireless Local Area Network (WLAN), RAN, satellite-based network, and the like.

The engines 208 may include routines, programs, objects, components, data structures, and the like, which perform particular tasks or implement particular abstract data types. The engines 208 may further include modules that supplement applications on the system 200, for example, modules of an operating system. Further, the engines 208 may be implemented in hardware, instructions executed by a processor, or by a combination thereof.

In an implementation, the engines 208 may be machine-readable instructions which, when executed by the processor 202, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 208 may perform different functionalities. The engines 208 include a data extraction engine 212, a recipe blueprint retrieval engine 214, a transformation engine 216, a collaborative recipe blueprint modification engine 218, a comparison and customization analysis engine 220, a remigration report generation engine 222, and a recipe blueprint activation and synchronization engine 224. The functions of the engines 212, 214, 216, 218, 220, 222, 224 are explained below.

In an example, the data extraction engine 212 may extract the data received from the external data source. Upon receiving the extracted data, the initiation of data transformation may be triggered. In an example, the system 200 may be designed to react automatically when data is received from the external data source 104. For example, a retail company may use its point-of-sale (POS) system as an external data source, continuously generating transaction data throughout the day and the extracted data by the data extraction engine 212 may include daily sales transactions, customer information, and inventory updates. The extracted data may be modified, cleaned, or restructured to fit the requirements of the target platform 106 or target data source. In an example, the transformation process may include data cleaning (removing duplicates, handling missing values), data type conversions, aggregations or calculations, joining or merging data from multiple sources, applying business rules or logic, normalizing or de-normalizing data structures, encoding categorical variables, and handling time zone conversions.

In an example implementation, the recipe blueprint retrieval engine 214 may retrieve a recipe blueprint associated with the data transformation. The recipe blueprint is a structured and comprehensive representation of the data transformation process. The recipe blueprint may be organized in a logical and systematic way to cover all aspects of the data transformation. For instance, the recipe blueprint may serve as a template, defining how data should be transformed from its original state in the external data source to its desired state in the target data source. The recipe blueprint encapsulates all the rules, mappings, and specifications needed for the transformation process. In an example, the recipe blueprint may be indicative of how data should be handled, transformed, and loaded into the target data source.

The recipe blueprint may include one or more of field mappings between external data source and target data source, data type conversions, transformation rules and formulas, filtering criteria, aggregation logic, custom field definitions, and data validation rules. For example, in a customer data integration project, a recipe blueprint may specify that the "CustomerName" field from the source CRM system should be split into "FirstName" and "LastName" fields in the target data warehouse, with specific rules for handling prefixes and suffixes.

In an example implementation, the recipe blueprint may be created by mapping the specifications of the external data source to the target data source. The mapping process may require deep knowledge of both the source and target systems, as well as an understanding of the business requirements for the transformed data. In an example, the mapping process may involve understanding the schema and data models of both the source and target systems, identifying corresponding fields or entities between the external data source to the target data source, defining how data should be transformed to fit the target system's requirements, and specifying any additional calculations or derivations needed.

The recipe blueprint may have two distinct states: a draft state and an active state. In the draft state, the recipe blueprint is editable. In an example, the draft state may allow for an iterative approach to define transformation rules, where the recipe blueprint may be refined over time based on review and feedback. In another example, the draft state may allow multiple team members to contribute to the recipe blueprint, bringing in expertise from different domains (e.g., data engineering, business analysis, compliance). In yet another example, the draft state may allow data teams to experiment with different transformation approaches without risking the integrity of ongoing data processes. In addition, as business requirements or source data structures change, the recipe blueprint may be updated in draft form before being applied to live processes. In an example, the system may provide an application programming interface (API) for checking a proposed draft recipe blueprint for inconsistencies with the domain model of the external data source.

In an example, the recipe blueprint may include one or more of record mappings between the external data source and the target data source, field mappings between the external data source and the target data source, record filtering criteria for the external data source, and customization specifications for the target data source. In an example implementation, multiple drafts of the recipe blueprint can exist and stored simultaneously, allowing different team members to work on various aspects of the transformation or to propose alternative approaches or configuration for the data transformation. For example, in preparation for a new marketing campaign, a draft recipe blueprint may be created to include additional customer segmentation logic. Marketing analysts may collaborate with data engineers to refine the logic in the draft state, running test transformations until the results meet their requirements. Thus, the draft state serves as a sandbox where changes can be made and reviewed without affecting ongoing data transformations.

Once a recipe blueprint transitions from the draft state to the active state, it becomes immutable (unchangeable). The active recipe blueprint is the one currently being used for actual data transformations. Immutability in the active state ensures that all data processed during a given period is transformed consistently, following the same set of transformation rules. In an example, the immutable active recipe blueprint may provide a clear record of how data was transformed at any given point in time, crucial for compliance and troubleshooting purposes. Immutability of the active recipe blueprint also prevents accidental changes, that may disrupt ongoing data processes or may introduce inconsistencies in transformed data.

In an example implementation, each time a new recipe blueprint is activated, the system 200 may effectively create a new version, allowing for clear tracking of how transformation rules have evolved over time. For example, an active recipe blueprint for financial data transformation may remain unchanged throughout a fiscal quarter, ensuring that all financial reports generated during that period are based on consistent transformation rules. Any changes needed would be developed in a draft recipe blueprint and activated only at the start of the new quarter. Thus, the dual-state nature of the recipe blueprint allows for a controlled process of creating, reviewing, and implementing changes to the transformation logic.

In an example, there may be a direct link and association between the recipe blueprint and the specific data transformation process it governs. The association ensures that the correct recipe blueprint is used for each data transformation process. Further, any changes in transformation logic can be tracked and associated with the specific data processing runs. In an example scenario, multiple data transformation processes may coexist, each using its own recipe blueprint. For example, in a data lake environment, different data pipelines may each have their own associated recipe blueprint. A recipe blueprint for transforming social media data would be distinct from one used for processing IoT sensor data, even if both pipelines are running concurrently.

In an example implementation, the transformation engine 216 may associate an active recipe blueprint with the data transformation. The association is a critical link that ensures the correct set of transformation rules is applied to the incoming data. The active recipe blueprint, as previously discussed, is an immutable version of the transformation specifications that has been finalized and approved for use in live data processing. By associating the active recipe blueprint with the data transformation process, the system ensures that all data will be consistently processed according to the most up-to-date and approved rules.

The active recipe blueprint serves as the definitive source of transformation rules. In an example, the transformation rules may encompass a wide range of data manipulation and mapping instructions that dictate how data should be transformed as it moves from the external data source to the target destination data source. The transformation rules may include field mappings (e.g., mapping "CustomerName" in the source to "FullName" in the target), data type conversions (e.g., converting date formats), data cleansing operations (e.g., standardizing phone number formats), complex calculations (e.g., computing a customer lifetime value based on transaction history), filtering criteria (e.g., excluding inactive accounts), and aggregation logic (e.g., summarizing daily sales by product category).

In an example implementation, the transformation engine 216 may synchronize the extracted data from the external data source to the target data source based on the transformation rules specified in the active recipe blueprint. The synchronization process, guided by the active recipe blueprint, ensures that the extracted data from the external data source is accurately transformed and loaded into the target data source. In an example, the synchronization may operate in different modes depending on the system's requirements. For instance, it may be a full synchronization where all data is processed, or an incremental synchronization where only new or changed data since the last sync is processed.

During the synchronization process, each piece of extracted data may be subjected to the transformation rules defined in the active recipe blueprint. The synchronization process may involve a series of steps, each applying specific rules from the active recipe blueprint. For example, customer data extracted from a CRM system may first undergo a name-splitting operation to separate first and last names, then a standardization process for addresses, followed by an enrichment step that may calculate customer segments based on transaction history. All these steps may be explicitly defined in the active recipe blueprint.

In an example, the synchronization process may also handle any discrepancies between the source and target data models. For instance, if the source system uses a flat structure for product data while the target system requires a hierarchical category structure, the transformation rules in the recipe blueprint may specify how to construct a hierarchical category structure from the flat data. Similarly, if the source system uses different enumeration values for status fields (e.g., "A" for active, "I" for inactive) compared to the target system ("Active" and "Inactive"), the recipe blueprint may define the mapping between these values.

In an example, the synchronization based on the active recipe blueprint may also facilitate compliance with data governance policies. For example, the recipe blueprint may include rules for data masking or encryption of sensitive information, ensuring that personally identifiable information (PII) is properly protected as it moves from the source to the target system. It may also specify retention policies, dictating how long certain types of data should be kept in the target system before being archived or deleted. The use of an active recipe blueprint in the synchronization process may also provide valuable metadata about the data transformation. Each synchronization run may be associated with a specific version of the active blueprint, creating a clear audit trail of how data is being processed at any given point in time. This is invaluable for troubleshooting, compliance audits, and understanding the lineage of data in the target system.

While the active recipe blueprint is immutable during the synchronization process, the overall system 200 may remain flexible through the ability to activate new recipe blueprints. When business requirements change or new data sources need to be integrated, a new recipe blueprint may be developed, reviewed in draft form, and then activated to become the new standard for synchronization. Such an approach allows the system 200 to evolve over time while maintaining consistency and control over each individual synchronization process.

In an example implementation, plurality of entities may participate in the process of modifying and refining the recipe blueprint, thereby forming a collaborative data transformation management system. In an example, the entity may be a user. The collaborative recipe blueprint modification engine 218 may be designed to accommodate input from multiple users. By allowing the plurality of users to collaboratively view and modify the recipe blueprint, the system 200 leverages collective intelligence and diverse perspectives to enhance the quality and effectiveness of the data transformation process.

On receiving a request from at least one user amongst the plurality of users to modify the recipe blueprint, the collaborative recipe blueprint modification engine 218 may initiate a collaborative workflow. The modification request may come from various users involved in the data management process. For example, a data analyst may request modifications to improve data quality, a business analyst may suggest changes to align the transformed data better with reporting needs, or a system administrator may propose updates to accommodate changes in the source or target systems.

In an example, users may request to modify the recipe blueprint processor in response to at least one of modifications in a domain model of the external data source, modifications in a domain model of the target data source, modifications based on the requirement of end-users, modifications based on identification of configuration mistakes, and availability of new attributes in the customization specifications.

The collaborative nature of the present subject matter allows for a comprehensive approach to data transformation, where different aspects of the process can be scrutinized and improved by individuals with varying areas of expertise. For instance, in a scenario involving the transformation of healthcare data, a clinical expert may provide insights into the medical significance of certain data fields, while a data engineer may focus on the technical aspects of the transformation rules. The system's ability to allow multiple users to view the recipe blueprint ensures transparency in the transformation process. This visibility enables all users to understand the current state of the transformation rules, fostering better communication and alignment among team members.

The users are empowered to propose and implement modifications or changes to the recipe blueprint. In an example, the modifications or changes involve adjusting field mappings, refining transformation rules, updating filtering criteria, or adding new custom fields to accommodate evolving data requirements. The collaborative modification feature encourages iterative improvement of the transformation process, allowing the team to respond quickly to changing business needs or to optimize the process based on observed outcomes.

In an example implementation, the collaborative recipe blueprint modification engine 218 may capture and store the proposed changes or proposed modifications to the recipe blueprint in a separate, editable version known as the draft recipe blueprint. For instance, when a user or multiple users propose modifications to the existing recipe blueprint, the modifications are not immediately applied to the active configuration. Instead, they are recorded in a draft version of the recipe blueprint. As discussed previously, the draft recipe blueprint serves as a sandbox environment where proposed changes can be developed, reviewed, and refined without risking disruption to ongoing data transformation processes.

The draft recipe blueprint acts as a working document that can be collaboratively edited and refined. Multiple users can contribute to the draft, adding their expertise and insights to improve the proposed modifications. The collaborative aspect is essential in environments where different team members may have specialized knowledge about various aspects of the data or systems involved in the transformation process. In an example, the draft recipe blueprint approach also supports version control. Each set of modifications can be treated as a distinct version, allowing teams to track the evolution of proposed changes over time. The versioning capability may be particularly useful in complex projects where multiple iterations of changes may be proposed and refined before a final version is approved for implementation.

In an example implementation, the comparison and customization analysis engine 220 may perform comparative analysis between the proposed modifications (encapsulated in the draft recipe blueprint) and the current active configuration (represented by the active recipe blueprint). The comparison is essential for identifying and understanding the specific modifications that would need to be applied to the target data source if the draft blueprint were to be implemented. The comparative analysis may allow the system to pinpoint exactly what has changed between the two versions, i.e., the draft recipe blueprint alongside the active recipe blueprint.

In an example, the comparative analysis may be based on differences in customization specifications. The customization specifications are the detailed instructions for how data should be structured, transformed, and stored in the target data source. In an example, customization specifications may define how the transformed data will fit into and interact with the target data source.

In an example implementation, the comparative analysis may identify differences in customization specifications, such as modifications to existing elements, creation of new elements, and removal of existing elements. Each of these types of modifications may have significant implications for how data is stored, processed, and utilized in the target data source. The customization specifications may include at least one of custom object definitions, custom field definitions, custom subtype definitions, custom stage definitions, data validation rules, data transformation logic, and data filtering criteria.

In an example, the proposed modifications may include modified custom objects or newly created custom objects. Custom objects in a data source may represent complex data structures or entities that are specific to the organization's needs and may not be covered by standard data models. For example, in a customer relationship management system, a custom object might be created to track detailed information about customer interactions that go beyond the standard fields provided by the system. When comparing recipe blueprints, the comparison and customization analysis engine 220 may identify any changes to these custom objects, such as alterations to their structure, relationships, or properties.

In another example, the proposed modifications may include changes to fields or newly created fields. Fields may represent individual pieces of data within objects. The comparative analysis may identify any modifications to existing fields, such as changes in data type (e.g., from text to number), alterations in field length, updates to field labels or descriptions, or modifications to field-level validation rules or default values. The comparative analysis may also highlight any new fields that have been added to accommodate additional data points required by the new transformation rules.

The comparative analysis may provide a clear and comprehensive view of exactly what would change if the draft recipe blueprint were to be implemented. This clarity is essential for decision-making, allowing users to fully understand the scope and impact of the proposed modifications before approving them. The comparison may also help in planning the implementation of changes. By identifying specific differences in customization specifications, it may be possible to create a detailed plan for applying these changes to the target data source. By understanding exactly what would change in the target data source, it may be possible to assess how the changes or modifications may affect other systems or processes that rely on this data. For example, if a field used in critical reports is being modified, the comparison would highlight this, allowing the team to plan for updates to those reports to ensure they continue to function correctly with the new data structure.

In an example implementation, the remigration report generation engine 222 may generate a remigration report. The remigration report may serve as a comprehensive preview of the changes that would be implemented if the draft recipe blueprint were to be activated. In an example, the remigration report may bridge the gap between proposed modifications and their practical implementation, providing users with a clear understanding of the potential impact of changes before they are applied to the real-time system.

The remigration report may be a detailed document outlining all the customization specifications that would be altered or introduced in the target data source if the draft recipe blueprint were to replace the current active blueprint. The remigration report may be generated based on the comparison between the draft and active recipe blueprints, translating the identified differences into a structured, readable format that clearly articulates the implications of the proposed changes. The term remigration in this context refers to the process of applying changes to existing data and structures in the target data source to align them with the new transformation rules specified in the draft blueprint. The report, therefore, not only lists the changes but also provides insight into how these changes would affect the existing data landscape.

The remigration report may provide transparency in the change management process. By generating a comprehensive overview of all potential modifications, the remigration report may allow all users, from data engineers and analysts to business users and system administrators, to understand the full scope of the proposed modifications.

In an example, the remigration report may include components, such as list all new custom objects that would need to be created in the target data source. These might include new entity types in a data warehouse, or new custom objects in a CRM system. For each new object, the report may provide details such as its structure, fields, relationships to other objects, and any specific properties or constraints. In another example, the generated remigration report may outline modifications to existing objects. The objections may include changes to field definitions (such as data type changes, length adjustments, or new validation rules), alterations to object relationships, or updates to object-level properties. In yet another example, the remigration report may also detail any new fields being added to existing objects. This may be particularly important as new fields often represent new data points being captured or calculated, which can have significant implications for reporting and analytics. The report may specify the properties of these new fields, including their data types, default values, and any calculations or transformations applied to populate them.

The remigration report may also highlight any changes to data relationships or hierarchies. For example, if the new recipe blueprint introduces a more granular product categorization system, the remigration report may detail how existing products would be remapped to this new hierarchy. In an example, the process of generating the remigration report may also serve as a final check on the proposed modifications. As the system compiles the remigration report, it may identify inconsistencies or potential issues in the draft recipe blueprint that weren't apparent during the initial design phase. This additional layer of validation may help in catching and addressing problems before they impact the real-time system.

Upon generation of the remigration report, the recipe blueprint activation and synchronization engine 224 may be configured to transition the recipe blueprint from its draft state to an active state and may proceed to process the newly activated blueprint. The transition of the draft recipe blueprint to the active state represents the point at which proposed changes or modifications to the transformation rules may be ready to be implemented in the real-time environment. In an example, the transition is not merely a change in status but signifies that the draft recipe blueprint has undergone necessary reviews, approvals, and validations, and is now deemed suitable for actual use in data transformation processes.

When the draft recipe blueprint transitions to the active state, it may be referred to as a transitioned active recipe blueprint. This new active blueprint essentially replaces the previous active blueprint, becoming the authoritative set of rules and specifications that may govern how data is to be transformed from the external data source to the target data source. The immutability of the active state ensures that once a blueprint becomes active, it remains consistent and unchangeable during its operational period, providing stability and predictability in the data transformation process.

In an example implementation, the processing of the transitioned active recipe blueprint may be based on the generated remigration report. The remigration report, generated earlier in the process, serves as a comprehensive guide detailing the differences between the new recipe blueprint and the old active blueprint. The remigration report may outline the specific changes in customization specifications that need to be applied to the target data source to align it with the new transformation rules. Applying the determined differences in customization specifications to the target data source may involve various actions depending on the nature and extent of the changes. For instance, the actions may include creating new database objects or fields, modifying existing data structures, updating data types, establishing new relationships between data entities, or implementing new calculation rules. The process of applying these changes may be carried out in a carefully orchestrated manner to minimize disruption to ongoing operations.

In an example, the recipe blueprint activation and synchronization engine 224 may retrieve extracted data for the changed record types and fields corresponding to the determined differences in customization specifications and transform the retrieved data based on the transitioned active recipe blueprint by updating existing data in the target data source to conform with the transitioned active recipe blueprint.

The execution of the modifications or changes based on the remigration report may ensure that the target data source is in alignment with the new transformation rules without the need for a complete data purge and reload. This approach is generally more efficient and less disruptive than completely rebuilding the target data source from scratch, especially in scenarios involving large volumes of data or where continuous data availability is crucial.

In an example implementation, the recipe blueprint activation and synchronization engine 224 may perform ongoing data synchronizations between the external data source and the target data source using the transitioned active recipe blueprint. The ongoing data synchronization may ensure that the target data source remains up-to-date with the external data source by transferring only the changes or new data, rather than replicating the entire dataset each time.

In an example, the ongoing data synchronization may be a continuous process occurring after the initial data transformation and loading have been completed. The ongoing data synchronization may be designed to keep the target data source aligned with the external data source as new data is added, existing data is modified, or data is deleted in the external data source. This process is governed by the transitioned active recipe blueprint, which defines the rules and specifications for how data should be transformed and synchronized.

In an example, the ongoing data synchronization may be of periodic nature, i.e., the synchronizations may occur at regular intervals. The intervals may be customized based on the specific needs of the organization and the nature of the data. For example, a financial system might require near-real-time synchronization, updating every few minutes, while a less time-sensitive system might update daily or weekly. In an example implementation, the ongoing synchronization process transfers only the changes or new data from the external data source to the target data source. This approach may also be referred to as an incremental or a delta synchronization and is far more efficient than full data transfers, especially when dealing with large datasets. The present subject matter thus offers several significant advantages in the field of data transformation. The present approach allows for flexible and dynamic updates to transformation rules without disrupting ongoing operations.

Figure 3:
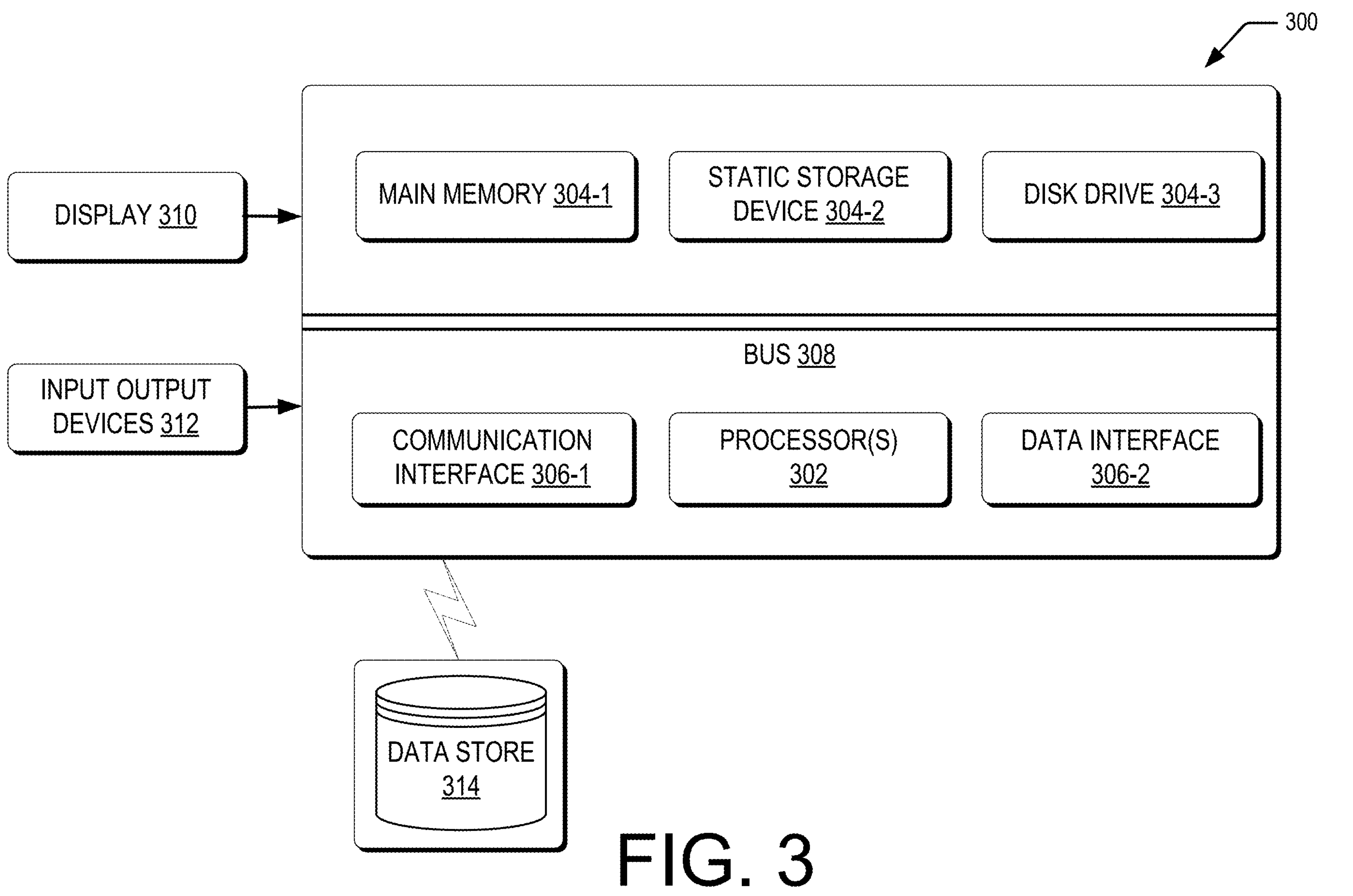
FIG. 3 illustrates a block diagram of a computing system suitable for implementing an embodiment of the present subject matter.

FIG. 3 illustrates a block diagram of a computing system 300 suitable for implementing an embodiment of the present subject matter. Computing system 300 may include a bus 308 or other communication mechanism for communicating information, which interconnects subsystems and devices, such as processor(s) 302, main memory 304-1 (e.g., RAM), static storage device 304-2 (e.g., ROM), disk drive 304-3 (e.g., magnetic or optical), communication interface 306-1 (e.g., modem or Ethernet card), display 310 (e.g., CRT or LCD), input device 312 (e.g., keyboard, and cursor control).

According to one embodiment of the present subject matter, the computing system 300 performs specific operations by the processor(s) 302 executing one or more sequences of one or more instructions contained in the main memory 304-1. Such instructions may be read into the main memory 304-1 from another computer readable/usable medium, such as the static storage device 304-2 or disk drive 304-3. In alternative embodiments, hard-wired circuitry may be used in place of or in combination with software instructions to implement the invention. Thus, embodiments of the present subject matter are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to the processor(s) 302 for execution. Such a medium may take many forms, including but not limited to, non-volatile media and volatile media. Non-volatile media includes, for example, optical or magnetic disks, such as disk drive 304-3. Volatile media includes dynamic memory, such as main memory 304-1. A data store 314 may be accessed in a computer readable medium using a data interface 306-2.

Common forms of computer readable media includes, for example, a floppy disk, a flexible disk, a hard disk, a magnetic tape, any other magnetic medium, a CD-ROM, any other optical medium, punch cards, a paper tape, any other physical medium with patterns of holes, RAM, PROM, EPROM, FLASH-EPROM, any other memory chip or cartridge, or any other medium from which a computer can read.

In an embodiment of the present subject matter, execution of the sequences of instructions to practice the present subject matter is performed by a single computing system 300. According to other embodiments of the present subject matter, two or more computing systems 300 coupled by communication link (e.g., LAN, PTSN, or wireless network) may perform the sequence of instructions required to practice the invention in coordination with one another.

The computing system 300 may transmit and receive messages, data, and instructions, including program, i.e., application code, through communication link and communication interface 306-1. Received program code may be executed by the processor(s) 302 as it is received, and/or stored in the disk drive 304-3, or other non-volatile storage for later execution.

In a typical configuration, the computer includes one or more processors (CPU), an input/output interface, a network interface, and a memory. The memory can consist of a non-persistent memory, a random-access memory (RAM), and/or a non-volatile memory in a computer-readable medium, for example, a read-only memory (ROM) or a flash memory (flash RAM). Memory is an example of a computer-readable medium.

Figure 4:
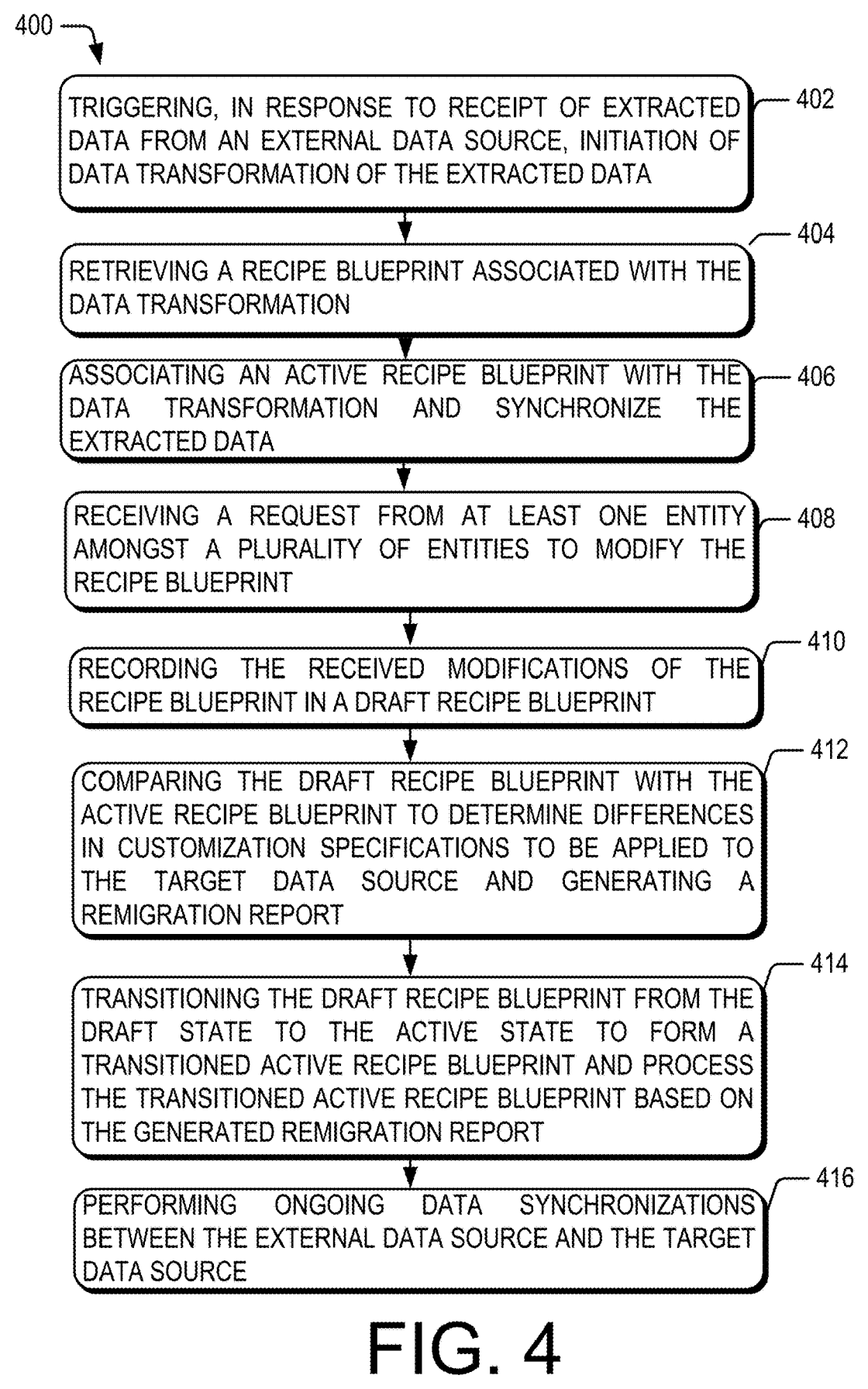

FIG. 4 illustrates a block diagram of a method for management of data transformation, in accordance with an example implementation of the present subject matter. Although the method 400 may be implemented in a variety of devices, but for the ease of explanation, the description of the method 400 is provided in reference to the above-described system 102 and 200. The order in which the method 400 is described is not intended to be construed as a limitation, and any number of the described method blocks may be combined in any order to implement the method 400, or an alternative method.

It may be understood that blocks of the method 400 may be performed in the system 102 and 200. The blocks of the method 400 may be executed based on instructions stored in a non-transitory computer-readable medium, as will be readily understood. The non-transitory computer-readable medium may comprise, for example, digital memories, magnetic storage media, such as magnetic disks and magnetic tapes, hard drives, or optically readable digital data storage media.

At block 402, the method includes triggering, in response to receipt of extracted data from an external data source, initiation of data transformation of the extracted data. This step marks the beginning of the data transformation process, which is activated when data is received from the external data source. In an example, the external data source may be any system or application that holds data which needs to be integrated into a target system or platform. The triggering mechanism is designed to be responsive and automatic, ensuring that the transformation process begins promptly upon data receipt. This responsiveness is crucial in scenarios where timely data processing is essential, such as in real-time analytics or time-sensitive business operations.

The extracted data may be of various formats and structures, depending on the nature of the external data source. In an example, the extracted data may be structured data from relational databases, semi-structured data like JSON or XML files, or even unstructured data from documents or web scraping. The initiation of data transformation at this stage sets in motion a series of subsequent steps that will clean, standardize, and restructure the data to fit the requirements of the target system.

At block 404, a recipe blueprint associated with the data transformation may be retrieved. The recipe blueprint may serve as a comprehensive guide that outlines how data should be transformed from its original state in the external data source to its desired state in the target data source. This blueprint is not just a simple set of instructions; it's a structured and complete representation of the entire transformation process. In an example, the creation of the recipe blueprint involves a detailed mapping of specifications between the external data source and the target data source. The mapping process requires a deep understanding of both systems' data models, structures, and requirements. It may involve field-to-field mappings, data type conversions, complex transformations, and even the creation of new fields or structures in the target system to accommodate the incoming data. A key feature of the recipe blueprint is its dual-state nature: draft and active. In its draft state, the blueprint is editable, allowing for modifications, refinements, and improvements. Once finalized and approved, the recipe blueprint transitions to its active state. In this state, it becomes immutable.

At block 406, the method includes associating an active recipe blueprint with the data transformation and synchronizing the extracted data based on the active recipe blueprint. The association of the active recipe blueprint with the data transformation process ensures the correct set of transformation rules is applied to the incoming data. This association acts as a bridge between the theoretical transformation rules (as defined in the blueprint) and their practical application to the real data. The synchronization of the extracted data involves applying the transformation rules, mappings, and specifications outlined in the recipe blueprint to the actual data extracted from the external source.

At block 408, a request may be received from at least one user amongst a plurality of users to modify the recipe blueprint. In an example, the plurality of users is allowed to collaboratively view and modify the recipe blueprint. This step introduces a collaborative aspect to the data transformation process, allowing for continuous improvement and adaptation of the transformation rules. The ability for multiple users to view and modify the recipe blueprint is a key feature that promotes collaboration and leverages collective expertise.

At block 410, the received modifications of the recipe blueprint may be recorded in a draft recipe blueprint. When modifications are proposed by users, instead of immediately applying these changes to the active recipe blueprint, they are recorded in a draft version. At block 412, the method includes comparing the draft recipe blueprint with the active recipe blueprint to determine differences in customization specifications to be applied to the target data source. The comparison step is critical for understanding the full impact of the proposed changes before they are implemented. The comparison process involves a detailed analysis of the differences between the draft and active blueprints. This analysis focuses on identifying changes in customization specifications, which are the detailed instructions for how data should be structured, transformed, and stored in the target data source.

At block 414, a remigration report may be generated. The remigration report serves as a comprehensive document that outlines all the changes that would need to be implemented in the target data source if the draft recipe blueprint were to be activated. For example, the remigration report translates the technical differences identified in the comparison step into a more readable and actionable format.

The draft recipe blueprint, after review and approval, is transitioned from its draft state to the active state, to form a transitioned active recipe blueprint. The transitioned active recipe blueprint may then be processed by implementing the changes outlined in the remigration report. The processing may include creating new custom objects, modifying existing fields, updating data relationships, and adjusting transformation rules in the target data source. In an example, the differences in customization specifications identified earlier may now be applied to the target data source. This may include database schema changes, creation of new objects or fields, modification of existing data structures, and updates to data processing logic.

At block 416, with the new blueprint active, the method includes performing ongoing data synchronizations between the external data source and the target data source. The synchronizations ensure that data continues to flow and be transformed according to the new specifications. The ongoing data synchronization helps in maintaining data consistency and up-to-date information in the target system.

Figure 5:
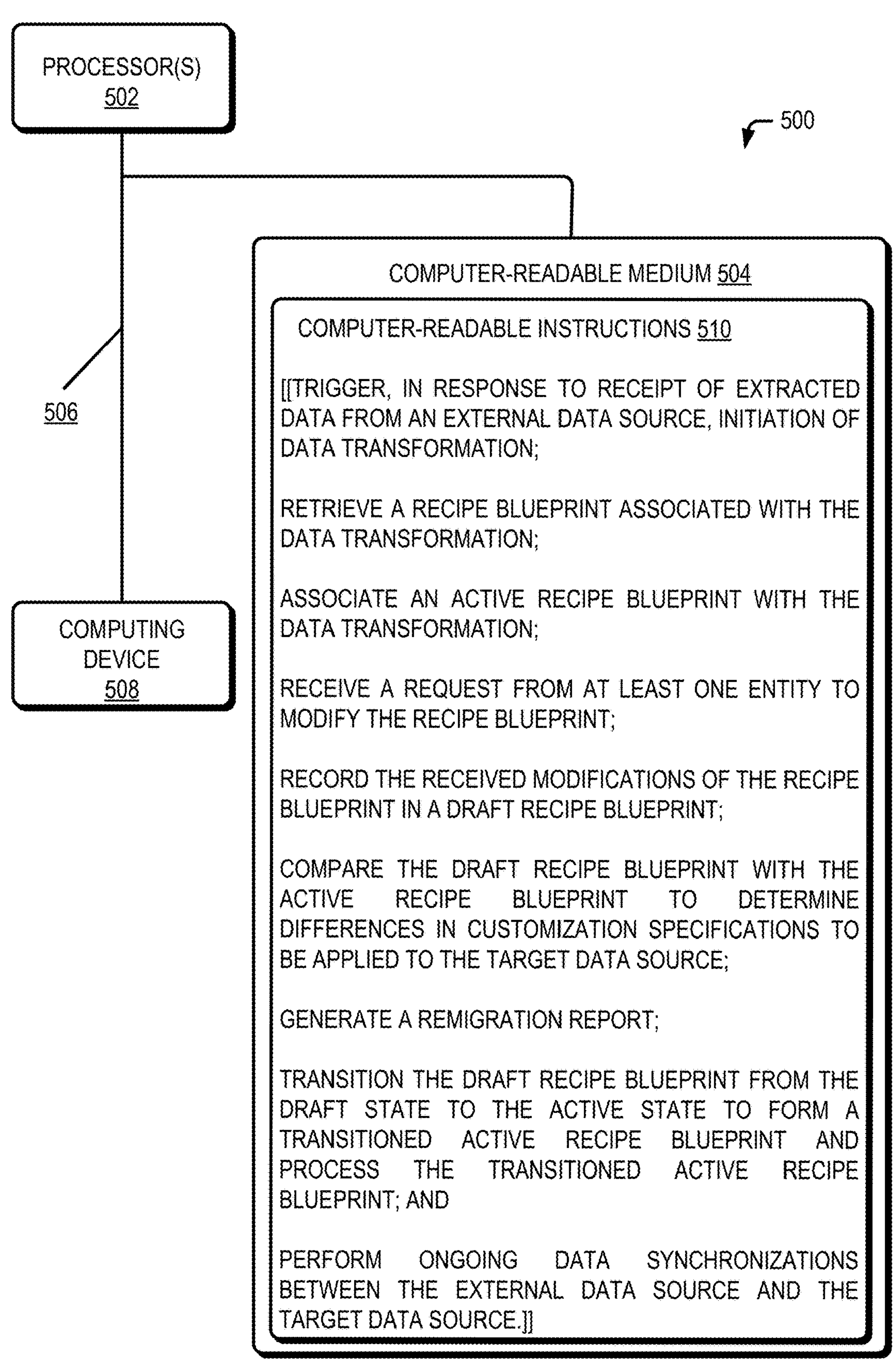
FIG. 5 illustrates a non-transitory computer-readable medium for management of data transformation, in accordance with an example of the present subject matter.

FIG. 5 illustrates a non-transitory computer-readable medium for management of data transformation, according to an example implementation of the present subject matter, in accordance with an example of the present subject matter.

In an example, the computing environment 500 comprises processor(s) 502 communicatively coupled to a non-transitory computer-readable medium 504 through communication link 506. In an example, the computing environment 500 may be, for example, the system 102, 200. In an example, the processor(s) 502 may have one or more processing resources for fetching and executing computer-readable instructions 510 from the non-transitory computer-readable medium 504. The processor(s) 502 and the non-transitory computer-readable medium 504 may be implemented, for example, in the system 102, 200.

The non-transitory computer-readable medium 504 may be, for example, an internal memory device or an external memory. In an example, the communication link 506 may be a network communication link, or other communication links, such as a PCI (Peripheral component interconnect) Express, USB-C (Universal Serial Bus Type-C) interfaces, I2C (Inter-Integrated Circuit) interfaces, etc. In an example, the non-transitory computer-readable medium 504 comprises a set of computer-readable instructions 510 which may be accessed by the processor(s) 502 through the communication link 506 and subsequently executed for facilitating optimization of cellular network performance of the network element. The processor(s) 502 and the non-transitory computer-readable medium 504 may also be communicatively coupled to a system 102, 200 over the network. The processor(s) 502 and the non-transitory computer-readable medium 504 may also be communicatively coupled to a computing device 508 through the communication link 506.

Referring to FIG. 5, in an example, the non-transitory computer-readable medium 504 comprises computer-readable instructions 510 that cause the processor(s) 502 to trigger initiation of data transformation of the extracted data in response to receipt of extracted data from an external data source. In an example, the external data source may be a system or an application that holds data which needs to be integrated into a target system or platform.

In an example, the computer-readable instructions 510 may then cause the processor(s) 502 to retrieve a recipe blueprint associated with the data transformation. The recipe blueprint may be a structured and complete representation of the data transformation. In an example, the recipe blueprint may be created by mapping the specifications of the external data source to a target data source and has a draft state and an active state, wherein the recipe blueprint is editable when in the draft state and is immutable when in the active state.

The computer-readable instructions 510 may then cause the processor(s) 502 to associate an active recipe blueprint with the data transformation and synchronize the extracted data based on the active recipe blueprint. The synchronization process may include various operations, such as data cleaning and standardization, data type conversions, field mappings, complex transformations, data enrichment, and filtering and validation.

In the example, the computer-readable instructions 510 may then cause the processor(s) 502 to receive a request from at least one user amongst a plurality of users to modify the recipe blueprint. The received modifications of the recipe blueprint are then recorded in a draft recipe blueprint. In an example, the draft recipe blueprint serves as a sandbox environment where proposed modifications can be developed, reviewed, and refined. This could involve adjusting field mappings, modifying transformation rules, adding new data quality checks, or incorporating new data elements.

In the example, the computer-readable instructions 510 may then cause the processor(s) 502 to compare the draft recipe blueprint with the active recipe blueprint to determine differences in customization specifications to be applied to the target data source. In an example, the customization specifications may include modified or created custom objects, fields, or elements in the target data source to accommodate the transformed data. Subsequently, a remigration report may be generated. The remigration report may be indicative of the customization specification that would occur if the draft recipe blueprint were to become active.

In the example, the computer-readable instructions 510 may then cause the processor(s) 502 to transition the draft recipe blueprint from the draft state to the active state to form a transitioned active recipe blueprint and process the transitioned active recipe blueprint based on the generated remigration report by applying the determined differences in customization specifications to the target data source. The ongoing data synchronizations may then be performed between the external data source and the target data source using the transitioned active recipe blueprint.

Although examples of the present subject matter have been described in language specific to methods and/or structural features, it is to be understood that the present subject matter is not limited to the specific methods or features described. Rather, the methods and specific features are disclosed and explained as examples of the present subject matter.

What is claimed is:

1. A system to manage data transformation, the system comprising:

a processor and a memory to store instructions, the instructions executable by the processor to:

trigger, in response to receipt of extracted data from an external data source, initiation of data transformation of the extracted data;

retrieve a recipe blueprint associated with the data transformation, the recipe blueprint being a structured and comprehensive representation of the data transformation, wherein the recipe blueprint is created by mapping specifications of the external data source to a target data source and has a draft state and an active state, and wherein the recipe blueprint is editable in the draft state and is immutable in the active state;

associate an active recipe blueprint with the data transformation, wherein the active recipe blueprint defines transformation rules, and synchronize the extracted data from the external data source to the target data source based on the transformation rules specified in the active recipe blueprint;

receive a request from at least one entity amongst a plurality of entities to modify the recipe blueprint, wherein at least some of the plurality of entities collaboratively view and modify the recipe blueprint, record the received modifications of the recipe blueprint in a draft recipe blueprint, compare the draft recipe blueprint with the active recipe blueprint to determine differences in customization specifications to be applied to the target data source, wherein the determined differences in the customization specifications include modified or created custom objects, fields, or elements in the target data source to accommodate the transformed data;

generate a remigration report, the remigration report being indicative of the customization specifications that corresponds to the draft recipe blueprint becoming active;

transition the draft recipe blueprint from the draft state to the active state to form a transitioned active recipe blueprint, wherein the transitioning is based on the generated remigration report by applying the determined differences in the customization specifications to the target data source; and perform ongoing data synchronization between the external data source and the target data source using the transitioned active recipe blueprint, wherein ongoing data synchronization is indicative of updates that transfer only the changes and new data from the external data source to the target data source.

2. The system of claim 1, wherein the recipe blueprint comprises one or more of record mappings between the external data source and the target data source, field mappings between the external data source and the target data source, record filtering criteria for the external data source, and the customization specifications for the target data source.

3. The system of claim 1, wherein, to process the transitioned active recipe blueprint based on the generated remigration report, the processor is to:

retrieve extracted data obtained from the external data source prior to the transition of the draft recipe blueprint;

re-transform the retrieved data based on the transitioned active recipe blueprint;

update existing data in the target data source to conform with the transitioned active recipe blueprint; and perform subsequent data synchronizations using the transitioned active recipe blueprint.

4. The system of claim 1, wherein the processor is to:

store a plurality of proposed draft recipe blueprints, wherein each draft recipe blueprint amongst the plurality of proposed draft recipe blueprints is indicative of an alternative configuration for the data transformation.

5. The system of claim 1, wherein the request to modify the recipe blueprint is received in response to at least one of:

modifications in a first domain model corresponding to the external data source;

modifications in a second domain model corresponding to the target data source;

modifications based on the requirement of end-users;

modifications based on identification of configuration mistakes; and availability of new attributes in the customization specifications.

6. The system of claim 1, wherein the processor is to:

provide an application programming interface (API) operable to check a proposed draft recipe blueprint for inconsistencies with the first domain model corresponding to the external data source.

7. The system of claim 1, wherein the customization specifications include at least one of custom object definitions, custom field definitions, custom subtype definitions, custom stage definitions, data validation rules, data transformation logic, and data filtering criteria.

8. The system of claim 1, the processor is to store extracted data from the external data source in an intermediate storage location prior to transformation.

9. The system of claim 1, wherein the processor is to:

perform periodic data synchronizations using the active recipe blueprint, wherein only changes in the external data source since the last synchronization are processed.

10. A computer implemented method for managing data transformation, the method comprising:

triggering, in response to receipt of extracted data from an external data source, initiation of data transformation of the extracted data;

retrieving a recipe blueprint associated with the data transformation, the recipe blueprint being a structured and comprehensive representation of the data transformation, wherein the recipe blueprint is created by mapping specifications of the external data source to a target data source and has a draft state and an active state, and wherein the recipe blueprint is editable in the draft state and is immutable in the active state;

associating an active recipe blueprint with the data transformation, wherein the active recipe blueprint defines transformation rules, and synchronize the extracted data from the external data source to the target data source based on the transformation rules specified in the active recipe blueprint;

receiving a request from at least one entity amongst a plurality of entities to modify the recipe blueprint, wherein at least some of the plurality of entities collaboratively view and modify the recipe blueprint, recording the received modifications of the recipe blueprint in a draft recipe blueprint, comparing the draft recipe blueprint with the active recipe blueprint to determine differences in customization specifications to be applied to the target data source, wherein the determined differences in the customization specifications include modified or created custom objects, fields, or elements in the target data source to accommodate the transformed data;

generating a remigration report, the remigration report being indicative of the customization specifications that corresponds to the draft recipe blueprint becoming active;

transitioning the draft recipe blueprint from the draft state to the active state to form a transitioned active recipe blueprint, and process the transitioned active recipe blueprint based on the generated remigration report by applying the determined differences in the customization specifications to the target data source; and performing ongoing data synchronization between the external data source and the target data source using the transitioned active recipe blueprint, wherein ongoing data synchronization is indicative of updates that transfer only the changes and new data from the external data source to the target data source.

11. The method of claim 10, wherein the recipe blueprint comprises one or more of record mappings between the external data source and the target data source, field mappings between the external data source and the target data source, record filtering criteria for the external data source, and the customization specifications for the target data source.

12. The method of claim 10, wherein to process the transitioned active recipe blueprint based on the generated remigration report, the method comprising:

retrieving extracted data for the changed record types and fields corresponding to the determined differences in the customization specifications;

transforming the retrieved data based on the transitioned active recipe blueprint by updating existing data in the target data source to conform with the transitioned active recipe blueprint; and performing subsequent data synchronizations using the transitioned active recipe blueprint.

13. The method of claim 10, wherein the request to modify the recipe blueprint is received in response to at least one of:

modifications in a first domain model corresponding to the external data source;

modifications in a second domain model corresponding to the target data source;

modifications based on the requirement of end-users;

modifications based on identification of configuration mistakes; and availability of new attributes in the customization specifications.

14. The method of claim 10, wherein the customization specifications include at least one of custom object definitions, custom field definitions, custom subtype definitions, custom stage definitions, data validation rules, data transformation logic, and data filtering criteria.

15. The method of claim 10, the method comprising:

performing periodic data synchronizations using the active recipe blueprint, wherein only changes in the external data source since the last synchronization are processed.

16. A non-transitory computer-accessible storage medium storing program comprising instructions for managing data transformation, the instructions being executable by a processor to:

trigger, in response to receipt of extracted data from an external data source, initiation of data transformation of the extracted data;

retrieve a recipe blueprint associated with the data transformation, the recipe blueprint being a structured and comprehensive representation of the data transformation, wherein the recipe blueprint is created by mapping specifications of the external data source to a target data source and has a draft state and an active state, and wherein the recipe blueprint is editable in the draft state and is immutable in the active state;

associate an active recipe blueprint with the data transformation, wherein the active recipe blueprint defines transformation rules, and synchronize the extracted data from the external data source to the target data source based on the transformation rules specified in the active recipe blueprint;

receive a request from at least one entity amongst a plurality of entities to modify the recipe blueprint, wherein at least some of the plurality of entities collaboratively view and modify the recipe blueprint, record the received modifications of the recipe blueprint in a draft recipe blueprint, compare the draft recipe blueprint with the active recipe blueprint to determine differences in customization specifications to be applied to the target data source, wherein the determined differences in the customization specifications include modified or created custom objects, fields, or elements in the target data source to accommodate the transformed data;

generate a remigration report, the remigration report being indicative of the customization specifications that corresponds to the draft recipe blueprint becoming active;

transition the draft recipe blueprint from the draft state to the active state to form a transitioned active recipe blueprint and process the transitioned active recipe blueprint based on the generated remigration report by applying the determined differences in the customization specifications to the target data source; and perform ongoing data synchronization between the external data source and the target data source using the transitioned active recipe blueprint, wherein ongoing data synchronization is indicative of updates that transfer only the changes and new data from the external data source to the target data source.

17. The non-transitory computer-accessible storage medium of claim 16, wherein the recipe blueprint comprises one or more of record mappings between the external data source and the target data source, field mappings between the external data source and the target data source, record filtering criteria for the external data source, and the customization specifications for the target data source.

18. The non-transitory computer-accessible storage medium of claim 16, wherein to process the transitioned active recipe blueprint based on the generated remigration report, the instructions cause the processor to:

retrieve extracted data for the changed record types and fields corresponding to the determined differences in the customization specifications;

transform the retrieved data based on the transitioned active recipe blueprint by updating existing data in the target data source to conform with the transitioned active recipe blueprint; and perform subsequent data synchronizations using the transitioned active recipe blueprint.

19. The non-transitory computer-accessible storage medium of claim 16, wherein the request to modify the recipe blueprint is received in response to at least one of:

modifications in a first domain model corresponding to the external data source;

modifications in a second domain model corresponding to the target data source;

modifications based on the requirement of end-users;

modifications based on identification of configuration mistakes; and availability of new attributes in the customization specifications.

20. The non-transitory computer-accessible storage medium of claim 16, wherein the customization specifications include at least one of custom object definitions, custom field definitions, custom subtype definitions, custom stage definitions, data validation rules, data transformation logic, and data filtering criteria.

* * * * *